(12) United States Patent
Spears

(10) Patent No.: US 10,224,623 B1
(45) Date of Patent: Mar. 5, 2019

(54) WALL MOUNTED ANTENNA HOUSING FOR A SPA

(71) Applicant: Waterway Plastics, Oxnard, CA (US)

(72) Inventor: Willy Spears, Oxnard, CA (US)

(73) Assignee: Waterway Plastics, Oxnard, CA (US)

( * ) Notice: Subject to any disclaimer, the term of this patent is extended or adjusted under 35 U.S.C. 154(b) by 273 days.

(21) Appl. No.: 15/097,670

(22) Filed: Apr. 13, 2016

(51) Int. Cl.
| | |
|---|---|
| *H01Q 1/42* | (2006.01) |
| *H05B 33/08* | (2006.01) |
| *A61H 33/00* | (2006.01) |
| *H04R 1/02* | (2006.01) |
| *G08C 19/00* | (2006.01) |
| *F03B 13/10* | (2006.01) |

(52) U.S. Cl.
CPC .............. *H01Q 1/42* (2013.01); *A61H 33/005* (2013.01); *F03B 13/10* (2013.01); *G08C 19/00* (2013.01); *H04R 1/02* (2013.01); *H05B 33/0842* (2013.01); *A61H 2201/5097* (2013.01)

(58) Field of Classification Search
CPC .......... H01Q 1/243; H01Q 1/42; F03B 13/10; G08C 19/10; H04R 1/02
USPC ................. 290/54; 340/825.72, 825; 381/87
See application file for complete search history.

(56) References Cited

U.S. PATENT DOCUMENTS

| | | | | |
|---|---|---|---|---|
| 2002/0175828 A1* | 11/2002 | Macey | ............... | G07C 9/00182 340/4.11 |
| 2012/0222997 A1* | 9/2012 | Potucek | ................. | H02J 5/005 210/167.18 |
| 2013/0175802 A1* | 7/2013 | Breau | ..................... | F03B 13/10 290/54 |

* cited by examiner

*Primary Examiner* — Hai Tran

(57) ABSTRACT

A system and apparatus for providing improved wi-fi controls to a spa that includes a specialized antenna housing for attachment through the wall of an existing spa, away from the body of water, other electronics as well as other interfering solid obstacles. The housing attaches to the electronics inside of the spa through a connector and a cable. The antenna is housed inside of the specialized housing and is equipped with electronic controls that can provide indicator LEDs visible from the outside of the spa wall. The specialized housing terminates in a flat surface for the LEDs to emanate from or for a wi-fi logo to be placed. The specialized housing is situated flush with the spa wall and is held in place with a nut or grommet.

8 Claims, 5 Drawing Sheets

WALL MOUNTED ANTENNA HOUSING FOR A SPA

BACKGROUND OF THE INVENTION

Field of the Invention

The field of this invention relates generally to the field of electronic controls for spas and more particularly toward a wall fitting for a remotely mounted antenna for use with electronic controls for a spa or a bath.

Description of the Prior Art

In the field of spas and baths with electronic controls for the control of jets and heat, wireless technology is often used to activate said controls. However, there are inherent problems with the use of wi-fi signals remotely for such controls. Wi-fi signals are blocked by water, metal, glass, brick, insulation and human bodies. Some or all of these elements are often present in spas.

Furthermore, wi-fi signals can also be disrupted by other electrical equipment that is often in close proximity to spa systems, including electric fans, other motors and fluorescent lighting. Some systems utilizing wi-fi to control spas are integrated into the electronic control of the spa, leaving the wi-fi subject to the limitations noted above. Other prior art systems include controls that use a remotely mounted antenna that would be hidden in the inside of the spa wall. The problem is compounded by the common placement of the electronic control in a position proximate the pumps and low in the spa. The water in the spa can create a "radio wave shadow" of up to 180 degrees. Therefore, a unique problem exists in the field that has yet to be addressed. It can be difficult to determine if a spa is equipped with wi-fi or if the wi-fi is active in existing systems.

It is the object of the instant invention to provide a system an apparatus to overcome the limitations of the prior art.

SUMMARY OF THE INVENTION

The basic embodiment of the present invention teaches a wall-mounted antenna housing assembly comprising: a wall on a spa with an aperture drilled therethrough; an antenna; a housing, said housing having a main body portion with a common central axis with said aperture, said main body portion having a first side and a second side wherein said main body portion terminates on said first side with an external end having an outer flange that is perpendicular to said common central axis and terminating on said second side with an internal end; wherein said main body portion is of sufficient size and shape to fit inside of said aperture in said wall on said spa and wherein said main body portion has a hollow interior to accept said antenna; a terminating face on said external end wherein said flange has an outer edge larger than said aperture; and a retaining member to secure said housing in said aperture wherein said internal end allows for said antenna to be wired to an electronic control to allow said electronic control to communicate with wi-fi enabled devices.

The above embodiment can be further modified by defining that a circuit board is included in said hollow interior for communication with wi-fi enabled devices.

The above embodiment can be further modified by defining that said external end has a transparent or translucent exterior face.

The above embodiment can be further modified by defining that said circuit board controls LEDs.

The above embodiment can be further modified by defining that said LED employs colors and/or flashing patterns to represent the status of the wi-fi connection.

The above embodiment can be further modified by defining that said retaining member is a threaded nut and said main body portion includes threads for engaging said threaded nut.

The above embodiment can be further modified by defining that said retaining member is a grommet, said grommet being compressed between said main body portion and said aperture.

The above embodiment can be further modified by defining that said retaining means are screws for securing said flange to said spa wall.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
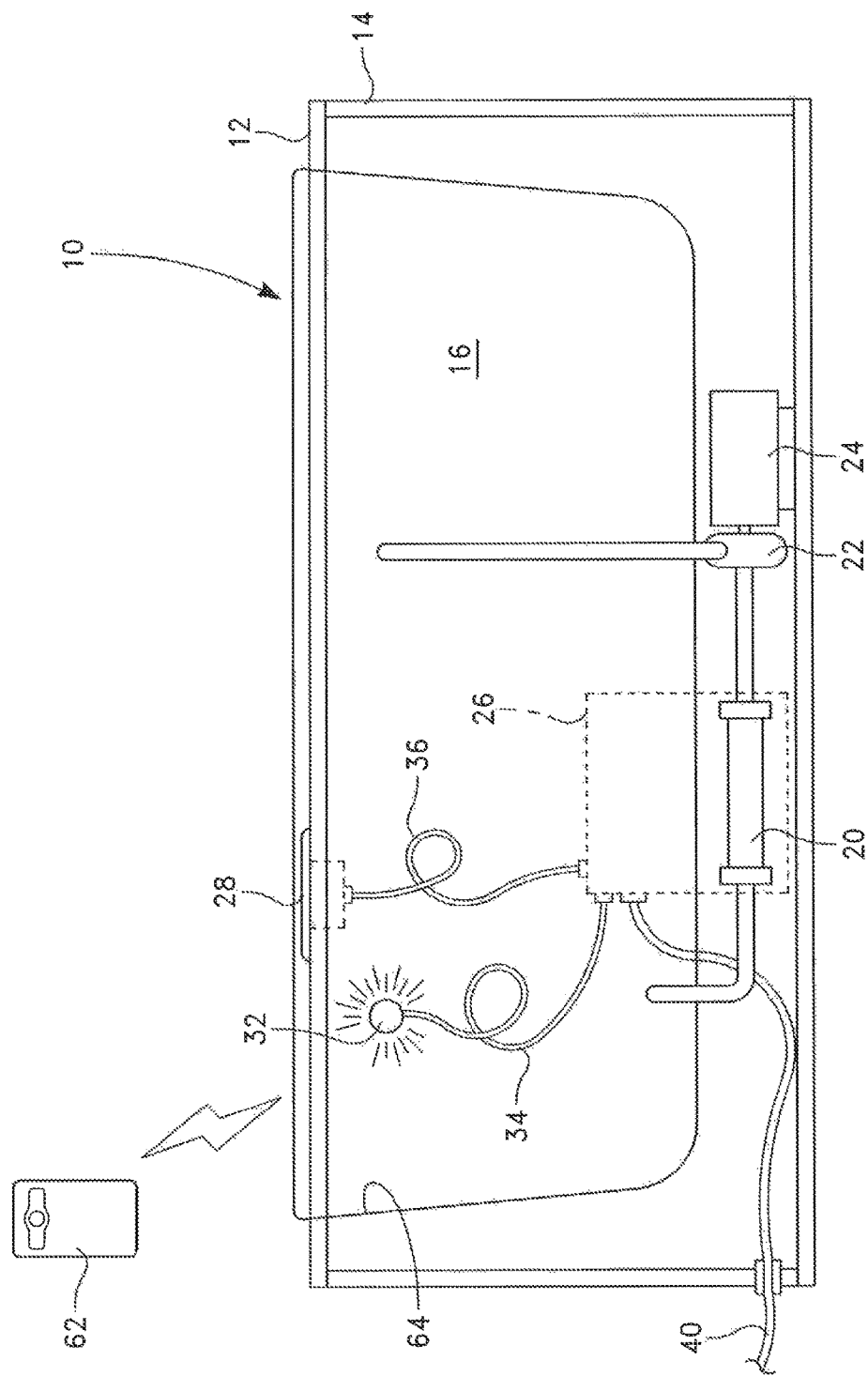
FIG. 1 shows a cross-sectional front view of a spa utilizing the system and apparatus of the instant invention.

Turning to the drawings, the preferred embodiment is illustrated and described by reference characters that denote similar elements throughout the several views of the instant invention.

The preferred embodiment provides for system and apparatus for including a wi-fi wall mounted antenna housing assembly 32 for a spa 10. The wall mounted antenna housing assembly 32 is mountable to the outer wall 14 of the spa housing. It is remotely positioned from the electronics 26 and mounted flush with the spa wall 14. The wall mounted antenna housing assembly 32 is moved away from, the position found in prior art systems in that it is moved out of the electronic control and incorporated into an existing spa mounted component. This system adds the wall mounted antenna housing assembly 32 to the user interface, which is mounted above the water level. The wall mounted antenna housing assembly 32 of the instant invention is not hidden like in some prior art devices as it is a visible design that includes an external end/terminating surface 48 can contain a wi-fi logo 70 thereon, or can light up as a visual indicator.

The crux of the instant invention is a wall mounted antenna housing assembly 32 that is mounted in a housing 42 for placement through a spa wall 14. The benefits of this invention are many. The through wall design allows for a common installation method that is used for most spa mounted equipment, i.e., the use of a housing 42 and nut or grommet 52. The through wall design allows for a wi-fi logo on the viewable external end/surface 48 of the wall mounted antenna housing assembly 32 to advertise the spa 10 is wi-fi equipped. The design lends itself to being clear or transparent, so colored LEDs 68 that indicate connectivity can be readily viewed from the outside of the spa FIG. 1 outlines the details of the entire system. The spa 10 has an outer spa housing 12 with typically four walls 14 surrounding it. The interior of the spa housing 12 includes a basin 64 for the body of water 16. There is a heater 20 connected to a pump 22 that is connected to a pump motor 24. Electronics 26 operate the system that activate the pump motor 24 that activates the pump 22 and the heater 20 and provides heated water to the basin containing the body of water 16. A control panel 28 runs the electronics and is accessible by users inside or out of the body of water 16.

Figure 3:
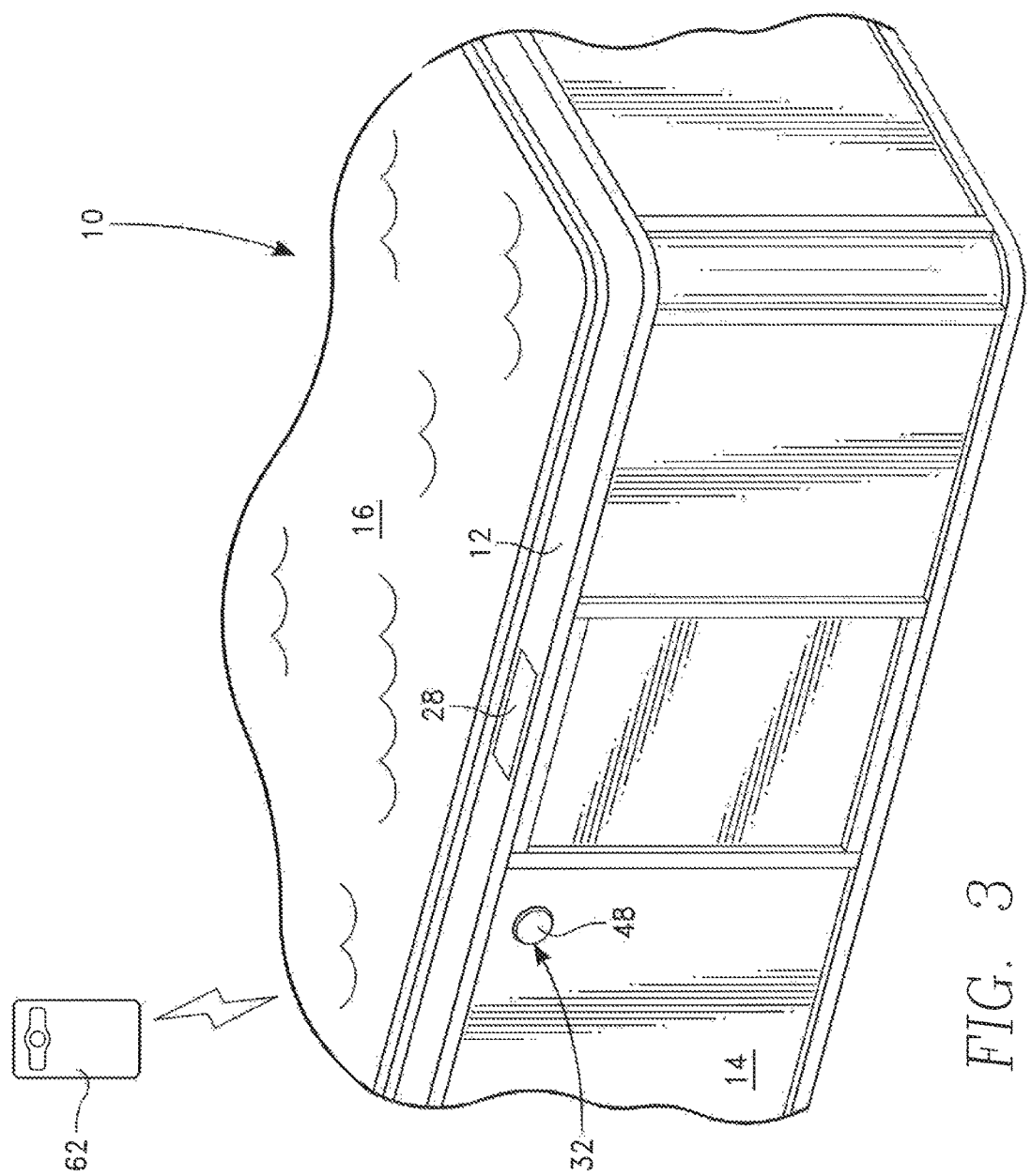
FIG. 3 is a cut-out view of the side of a spa showing the antenna visible from the side of the spa.

The wall mounted antenna housing assembly 32 of the instant invention is connected to the electronics 26 through a wire 34. Likewise, the control panel 28 is connected to the electronics 26 through a wire 36 and the electronics are connected to a power source with a power cable 40. The wall mounted antenna housing assembly 32 is remotely mounted from the electronics 26 and visible through the spa wall 14 as seen in FIG. 3. This wall mounted antenna housing assembly 32 has a terminating end/surface 48 that can either be equipped with a logo 70 wherein said logo 70 could be a wi-fi logo or other logo and it can be equipped with LEDs 68 to light up when activated. Additionally, the LEDs 68 could also change color or blink to indicate various states of the wi-fi, such as not connected, connecting, connected, transmitting, receiving, strength of connection and speed of connection.

Figure 2:
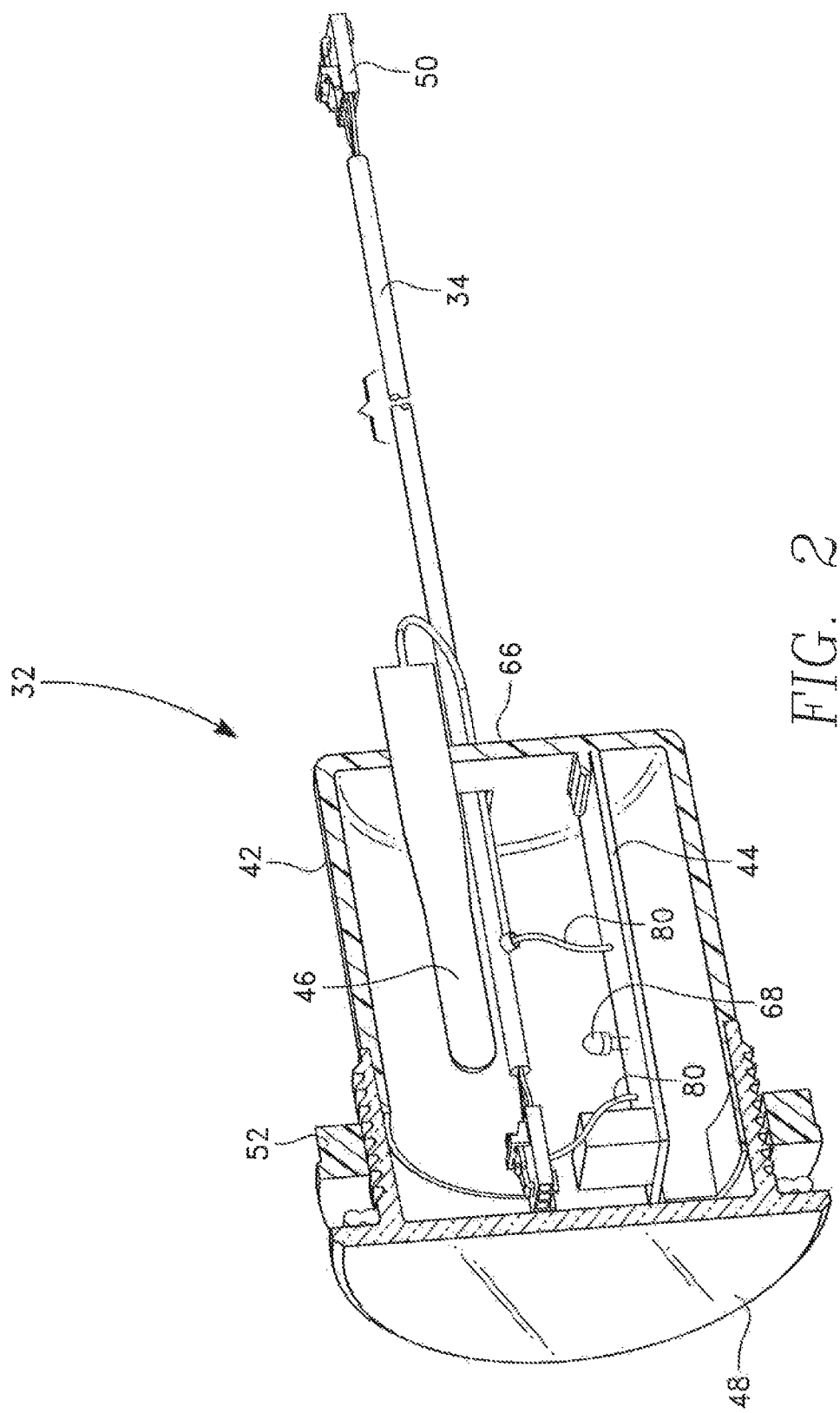
FIG. 2 is a side perspective cross-sectional view of the wall fitting for the antenna of the instant invention.

FIG. 2 is a cross-sectional view of the wall mounted antenna housing assembly 32 of the instant invention. On the interior end surface/interior terminating surface 66 is a connector 50 that connects it to the electronics 26 of the spa through a wire 34. The wire 34 terminates in the antenna 46 itself which is contained in the housing 42. The wire 34 terminates at the circuit board 44 and a separate wire or wires 80 connect the antenna 46 to the circuit board 44. Embodiments without the circuit board. 44 have the antenna 46 connecting directly to the electronics 26. The outer end of the wall mounted antenna housing assembly 32 is a flat surface 48 that can advertise the wi-fi capabilities of the spa 10 or that can include one or more LEDs 68 to indicate it is in use. The housing 42 includes the circuit board 44 for the wi-fi antenna 46 to light up with one or more LEDs 68 as desired.

Figure 4:
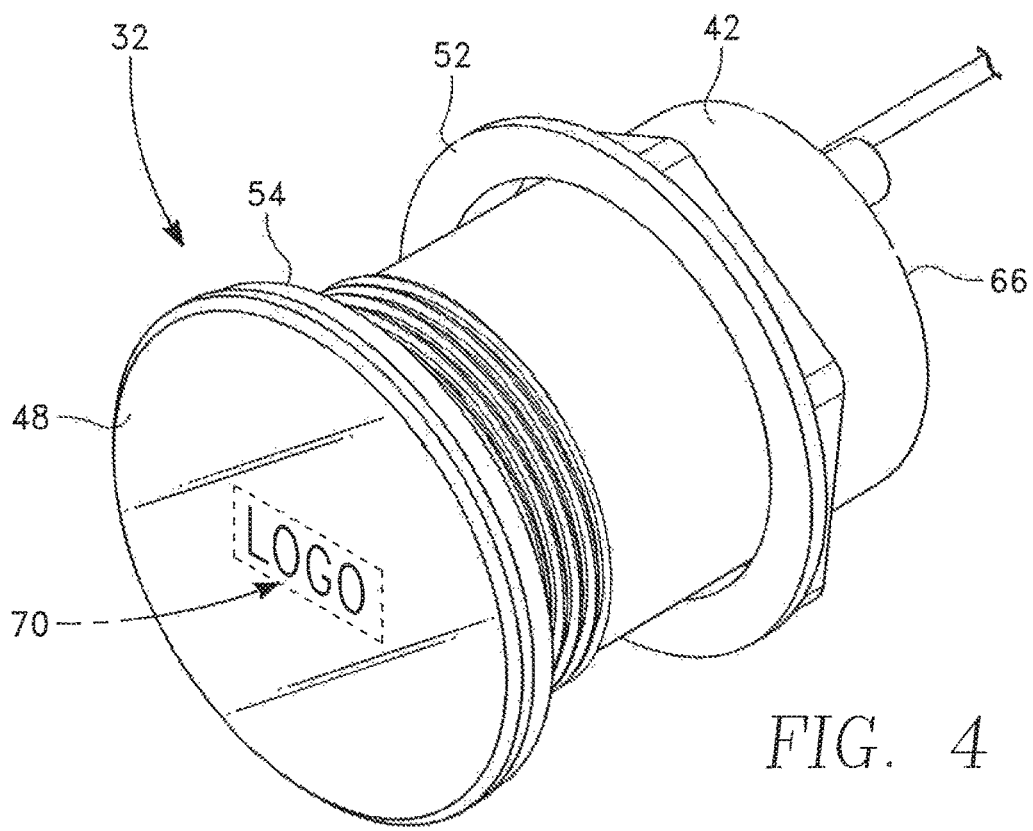
FIG. 4 is a perspective view of the wall fitting of the instant invention.
Figure 4A:
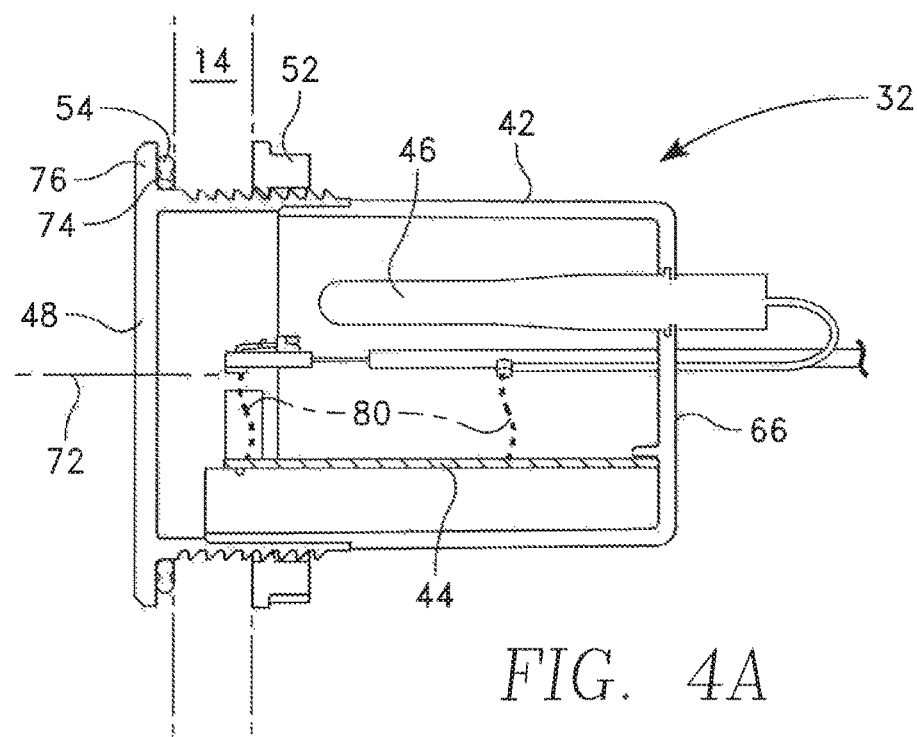
FIG. 4A is a side cross-sectional view of the antenna wall fitting mounted on a cutaway of a spa substrate.

FIGS. 4-4A are perspective and side cross sectional view of the preferred embodiment of the wall mounted antenna housing assembly 32 of the instant invention. The wall mounted antenna housing assembly 32 has the exterior terminating end/surface 48 connected directly to a gasket 54 and mates with a nut 52 on the outside of the housing 42 when it connects to the wall 14 of a spa. In FIG. 4A this is shown in cross-section. The wall thickness 14 can be variable and the nut 52 is movable along the body while engaging threads on the housing 42 and threads with the seal 54 to seal down thereby allowing the nut 52 to contact the interior side of the wall 14 and cause the housing 42 to continue to move along the common central access 72 causing the gasket 54 to be compressed between flange 76 and the exterior side of the substrate wall 14. The gasket 54 seals the area between the exterior terminating end/surface 48 and the wall 14 of the spa. A retaining member 52 in the form of a nut 52A is used to compress the gasket 54 between the flange 76 of the exterior terminating end/surface 48 and the wall 14 of the spa by engaging the threads on the inner diameter of the nut 52 with the threads on the outer diameter of the body of the housing and applying torque to the nut for adequate compression on the gasket 54. As seen in FIG. 4A, the wall mounted antenna housing assembly 32 and the aperture 74 share a common central axis 72. The antenna 46 and the circuit board 44 are positioned parallel with the common central axis 72 within the housing 42. Both the external terminating end/surface 48, having the flange 76, and the interior end/interior terminating surface 66 are aligned perpendicular to said common central axis 72.

Figure 5:
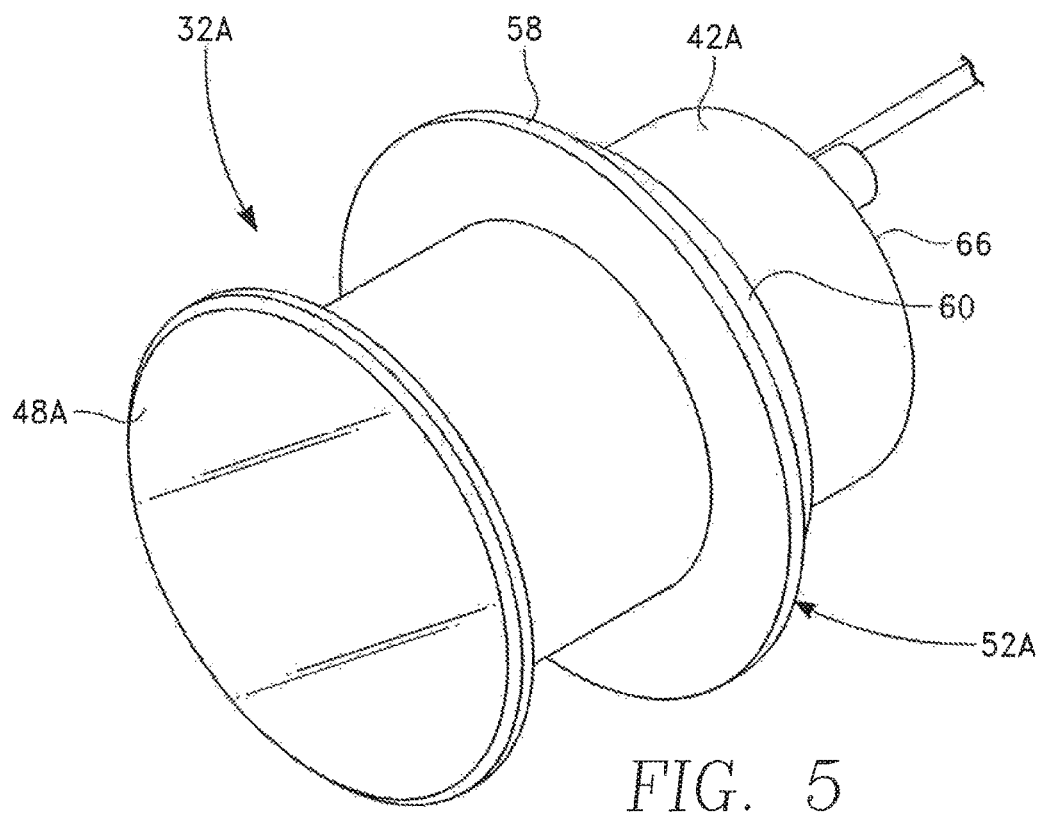
FIG. 5 is a perspective view of an alternate embodiment of the wall fitting of the instant invention.
Figure 5A:
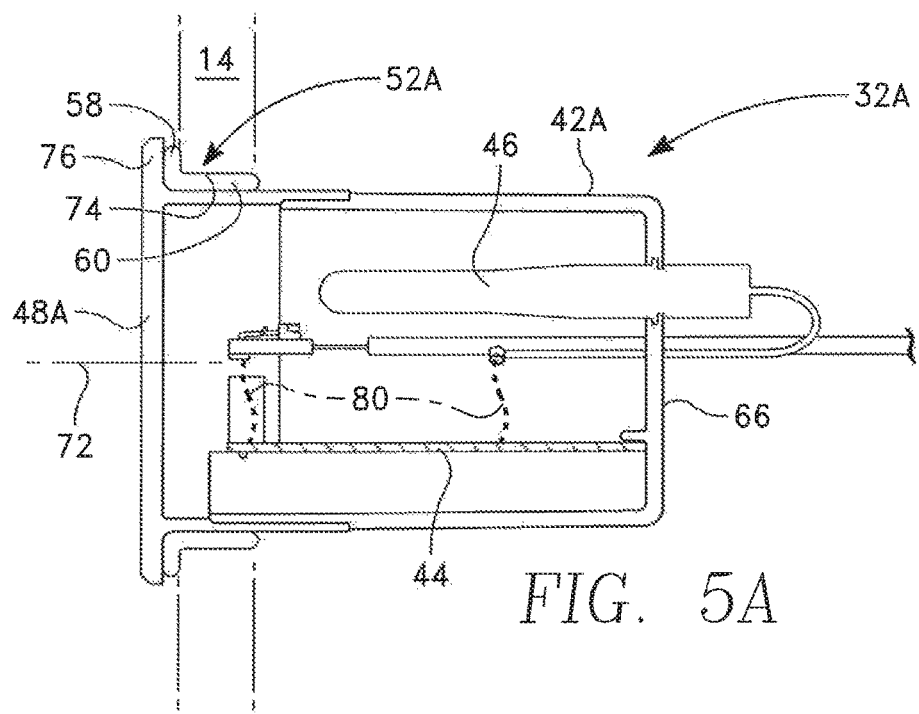
FIG. 5A is a side cross-sectional view of an alternate embodiment of the antenna wall fitting mounted on a cutaway of a spa substrate.

FIGS. 5-5A show perspective and side cross sectional views of an alternate embodiment of the wall mounted antenna housing assembly 32A of the instant invention. This embodiment of the wall mounted antenna housing assembly 32 also has a terminating end/surface 48A of the housing 42A and there is a retaining member in the form of a grommet 52A that works as a seal. The grommet 52A has a vertical wall 58 and a horizontal wall 60 with a space created therebetween for accepting the housing 42A. The walls 58, 60 surround the substrate wall 14 at the aperture 74. The aperture 74 and the housing 42A share the common central axis 72 and the horizontal wall 60 of the grommet 52A is located in between the wall 14 and the outside of the housing 42A. The grommet 52A is compressed perpendicular to the common central axis 72 within the aperture 74 which retains the wall mounted antenna housing assembly 32 within the aperture 74 and creates a seal between the wall 14 and the housing 42A. The space between the wall within the aperture 74 and the housing 42 with vertical wall 58 contacting the exterior side of the substrate wall 14 and external terminating end/surface 48.

The substrate wall 14 could be positioned other than vertical and could be horizontal or angled. The wall for mounting the wall-mounted antenna housing assembly could be part of the basin as well. The wall mounted antenna housing assembly could also incorporate a control panel on the external end/terminating surface 48.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A wall-mounted antenna housing assembly comprising:
a wall on a spa with an aperture drilled therethrough;
an antenna;
a housing, said housing having a main body portion with a common central axis with said aperture, said main body portion having a first side and a second side wherein said main body portion terminates on said first side with an external end having an outer flange that is perpendicular to said common central axis and terminating on said second side with an internal end;
an antenna housing;
wherein said main body portion is of sufficient size and shape to fit inside of said aperture in said wall on said spa and wherein said main body portion has a hollow interior to accept said antenna;
a terminating face on said external end wherein said flange has an outer edge larger than said aperture; and
a retaining member to secure said antenna housing in said aperture wherein said internal end allows for said antenna to be wired to an electronic control to allow said electronic control to communicate with wi-fi enabled devices wherein said antenna is located remotely from said electronic control and wherein said remotely located antenna is the sole mechanism enabling said electronic control to connect wirelessly.

2. The wall-mounted antenna housing assembly as defined in claim 1 wherein a circuit board is included in said hollow interior for communication with wi-fi enabled devices.

3. The wall-mounted antenna housing assembly as defined in claim 2 wherein said circuit board controls LEDs.

4. The wall-mounted antenna housing assembly as defined in claim 3 wherein said LED employs colors and/or flashing patterns to represent the status of the wi-fi connection.

5. The wall-mounted antenna housing assembly as defined in claim 1 wherein said external end has a transparent or translucent exterior face.

6. The wall-mounted antenna housing assembly as defined in claim 1 wherein said retaining member is a threaded nut and said main body portion includes threads for engaging said threaded nut.

7. The wall-mounted antenna housing assembly as defined in claim 1 wherein said retaining member is a grommet, said grommet being compressed between said main body portion and said aperture.

8. The wall-mounted antenna housing assembly as defined in claim 1 wherein said retaining member is a quantity of screws for securing said flange to said spa wall.

* * * * *